US011817112B2

(12) United States Patent
    Hu

(10) Patent No.: US 11,817,112 B2
(45) Date of Patent: Nov. 14, 2023

(54) METHOD, DEVICE, COMPUTER READABLE STORAGE MEDIUM AND ELECTRONIC APPARATUS FOR SPEECH SIGNAL PROCESSING

(71) Applicant: Beijing Horizon Robotics Technology Research and Development Co., Ltd., Beijing (CN)

(72) Inventor: Yuxiang Hu, Beijing (CN)

(73) Assignee: Beijing Horizon Robotics Technology Research and Development Co., Ltd., Beijing (CN)

( * ) Notice: Subject to any disclaimer, the term of this patent is extended or adjusted under 35 U.S.C. 154(b) by 296 days.

(21) Appl. No.: 17/352,748

(22) Filed: Jun. 21, 2021

(65) Prior Publication Data
    US 2021/0312936 A1    Oct. 7, 2021

Related U.S. Application Data

(63) Continuation of application No. PCT/CN2020/071205, filed on Jan. 9, 2020.

(30) Foreign Application Priority Data

Jan. 15, 2019    (CN) .......................... 201910035553.3

(51) Int. Cl.
    *G10L 21/0216*    (2013.01)
    *G06T 7/70*    (2017.01)
    (Continued)

(52) U.S. Cl.
    CPC ............ *G10L 21/0216* (2013.01); *G06T 7/70* (2017.01); *G10L 21/0232* (2013.01);
    (Continued)

(58) Field of Classification Search
    CPC . G10L 21/0216; G10L 21/0232; G10L 25/18;
    G10L 21/0208; G10L 21/0272;
    (Continued)

(56) References Cited

U.S. PATENT DOCUMENTS 6,339,758 B1 *    1/2002    Kanazawa .............. G10L 21/02
                                                        704/226

FOREIGN PATENT DOCUMENTS

CN            1333994 A      1/2002
CN          102164328 A      8/2011
(Continued)

OTHER PUBLICATIONS

Written Opinion issued in corresponding PCT Application No. PCT/CN2020/071205, dated Apr. 8, 2020.
International Search Report issued in corresponding PCT Application No. PCT/CN2020/071205, dated Apr. 8, 2020.

*Primary Examiner* — Yogeshkumar Patel
(74) *Attorney, Agent, or Firm* — Westbridge IP LLC

(57) ABSTRACT

A method, a device, a computer readable medium and an electronic apparatus for speech signal processing are disclosed. The method comprises: acquiring sound source position information and at least two channels of sound signals from a microphone array; suppressing, according to the sound source position information, a sound signal from the sound source direction in the at least two channels of sound signals, to obtain a noise reference signal of the microphone array; acquiring, according to the sound source position information, a sound signal from the sound source direction in the at least two channels of sound signals, to obtain a speech reference signal; removing, based on the noise reference signal, a residual noise signal in the speech reference signal to obtain a desired speech signal.

20 Claims, 9 Drawing Sheets

(51) Int. Cl.
*G10L 21/0232* (2013.01)
*G10L 25/18* (2013.01)
*H04R 1/32* (2006.01)
*H04R 3/00* (2006.01)

(52) U.S. Cl.
CPC .............. *G10L 25/18* (2013.01); *H04R 1/326* (2013.01); *H04R 3/005* (2013.01); *G10L 2021/02166* (2013.01)

(58) Field of Classification Search
CPC . G10L 2021/02082; G10L 2021/02166; G06T 7/70; H04R 1/326; H04R 3/005; H04R 2430/21; H04R 1/406
See application file for complete search history.

(56) References Cited

FOREIGN PATENT DOCUMENTS

| | | | |
|---|---|---|---|
| CN | 102164328 A | * | 12/2013 |
| CN | 104041073 A | | 9/2014 |
| CN | 106782589 A | | 5/2017 |
| CN | 107993671 A | | 5/2018 |
| CN | 108735227 A | | 11/2018 |
| JP | 2000047699 A | | 2/2000 |
| JP | 2007215163 A | * | 8/2007 |
| JP | 2007215163 A | | 8/2007 |
| JP | 2008236077 A | | 10/2008 |

\* cited by examiner

METHOD, DEVICE, COMPUTER READABLE STORAGE MEDIUM AND ELECTRONIC APPARATUS FOR SPEECH SIGNAL PROCESSING

CROSS-REFERENCE TO RELATED APPLICATIONS

The application is a Continuation Application of PCT application No. PCT/CN2020/071205, filed on Jan. 9, 2020, which claims priority of Chinese patent application No. 201910035553.3, filed on Jan. 15, 2019. All of the aforementioned applications are incorporated herein by reference in their entireties.

TECHNICAL FIELD

The disclosure relates to the technology filed of speech enhancement, in particular to a method, a device, a computer readable media and an electronic apparatus for speech signal processing.

BACKGROUND

With the popularity of vehicle-mounted intelligent devices, speech technology has been developed unprecedentedly in modern life, and as an important carrier of information transmission, whether the quality of speech can be guaranteed will affect the auditory effect reached a human ear or the processing effect of a speech processing system. In the real environment (for example, a vehicle-mounted system), the quality of a speech signal picked up by a microphone array will reduce significantly due to the influence of environmental noise, reverberation and interference. Speech separation technology takes improving the quality of speech as the starting point to effectively suppress the noise, so as to enhance the quality of a noisy speech signal in closed environment and restore an original pure speech signal as much as possible.

SUMMARY

This present disclosure is proposed to solve the above technical problems.

According to one aspect of the present disclosure, the present disclosure provides a method for speech signal processing, including: acquiring sound source position information and at least two channels of sound signals from a microphone array; suppressing, according to the sound source position information, a sound signal from a sound source direction in the at least two channels of sound signals, to obtain a noise reference signal of the microphone array; acquiring, according to the sound source position information, a sound signal from the sound source direction in the at least two channels of sound signals, to obtain a speech reference signal; and removing, based on the noise reference signal, a residual noise signal in the speech reference signal to obtain a desired speech signal.

According to another aspect of the present disclosure, the present disclosure provides an electronic apparatus, including:

a processor; and a memory for storing instructions executable by the processor, wherein the processor is configured to perform a method for speech signal processing, comprising:

acquiring sound source position information and at least two channels of sound signals from a microphone array;

suppressing, according to the sound source position information, a sound signal from a sound source direction in the at least two channels of sound signals to obtain a noise reference signal of the microphone array;

acquiring, according to the sound source position information, a sound signal from the sound source direction in the at least two channels of sound signals to obtain a speech reference signal; and removing, based on the noise reference signal, a residual noise signal in the speech reference signal to obtain a desired speech signal.

According to another aspect of the present disclosure, the present disclosure provides a non-transitory computer readable storage medium, the storage medium stores computer programs, and the computer programs are configured to perform any one of the methods described above.

Combining with the sound source position information, the method, device, computer readable storage medium and electronic apparatus for speech signal processing provided by the present disclosure, on the one hand, suppresses the sound signal from the sound source direction to obtain the noise reference signal, on the other hand, acquires the sound signal from the sound source direction to obtain the speech reference signal, then removes the noise signal from the speech reference signal, so as to achieve the purpose of lower noise and improving the speech enhancement effect.

BRIEF DESCRIPTION OF DRAWINGS

These and other purpose, features and advantages described in the present disclosure may be more apparent by describing embodiments in more detail of the present disclosure embodiments with reference to the following drawings. The drawings are used to provide a further understanding of the present disclosure embodiments and form part of the specification. The drawings are used to explain the present disclosure together with the embodiments of the present disclosure, but not to restrict the present disclosure. The same reference label usually represents the same part or step in drawings.

DETAILED DESCRIPTION OF THE EMBODIMENTS

The exemplary embodiments are described in detail below with reference to the drawings. Obviously, the described embodiments are only a part of the embodiments of the present disclosure and not all of them. It should be understood that the present disclosure is not restricted on the exemplary embodiments described herein.

In the field of speech enhancement technology, it is one of the most challenging problems for speech enhancement system to extract the speech signal of the desired speaker from a noisy environment (for example, the environment includes music, vehicle driving noise, and sounds of multiple speakers). In some technologies, the Blind Source Separation (BSS) system or Generalized Sidelobe Canceller (GSC) are used to separate speech to identify and enhance the speech signal from a specific sound source direction, so as to obtain the speech signal of the desired speaker. However, due to the time delay and spatial filtering effect of speech signals, the separation of the desired speech signal by BSS or GSC may result in problems such as large noise interference or leakage of the expected speech signal, so that the quality of the separated speech is not ideal. When the number of the sound source is more than the number of the microphone, the stability of the separation performance of the BBS system is poorer, and the noise interference of the expected speech signal is too large. The design of a blocking matrix of the GSC is complex, and the blocking matrix designed by currently free field sound propagation model will cause a signal leakage of the expected direction.

Combining with the sound source position information, the present disclosure separates the noise signal in the sound signal from the sound source direction, then removes the residual noise from the sound signal from the sound source direction based on the separated noise signal, so as to achieve the purpose of reducing noise interference and improving speech enhancement effect, thereby extracting the desired speech signal with better signal quality.

Figure 1:
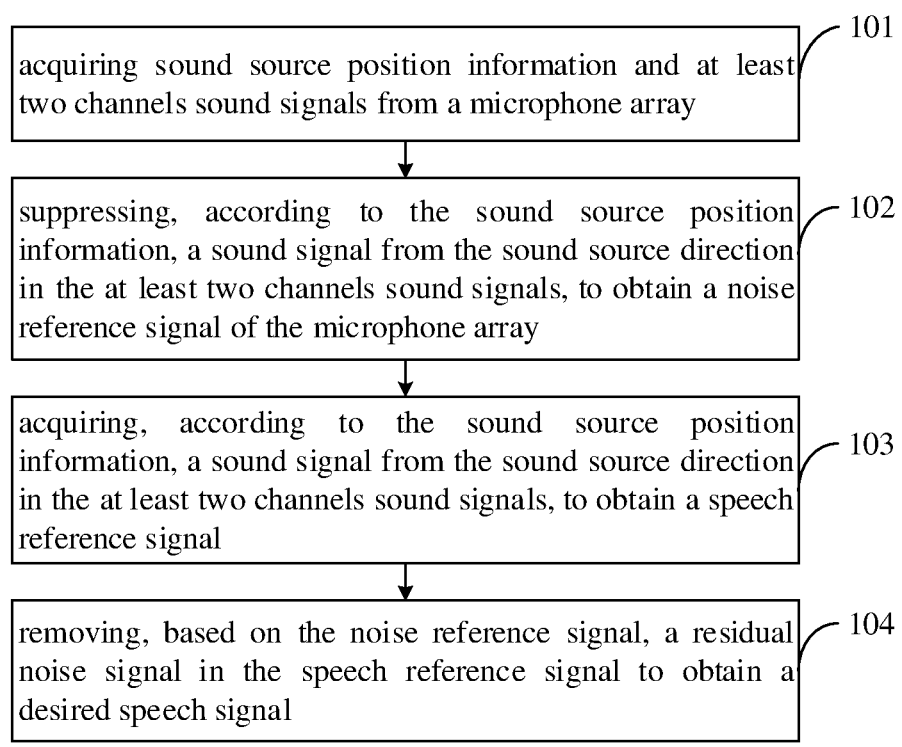
FIG. 1 is a flow diagram illustrating a method for speech signal processing in the first exemplary embodiment.

FIG. 1 is a flow diagram illustrating a method for speech signal processing in the first exemplary embodiment. This embodiment can be applied to electronic apparatus. As shown in FIG. 1, the method includes following steps:

Step 101, acquiring sound source position information and at least two channels of sound signals from a microphone array.

The sound source position information may be obtained by image recognition. For example, acquiring an image by an image acquisition device, and then recognizing the acquired image to determine the position of each sound source, so as to form the sound source position information. The sound source position information may include distance information, angle information, or the combination of distance information and angle information of the sound source relative to the microphone array.

Microphone array consists of several microphones arranged in a certain geometric size in space. The microphone array may acquire the spatial domain and time/frequency information of the sound source from the environment, and the spatial domain and time/frequency information may be used as sound signals to achieve the subsequent localization and tracking of the sound source. In the present disclosure, at least two sound signals may be obtained from the microphone array, and the sound signals come from a plurality of sound sources. For example, in the vehicle-mounted environment, the sound signals may include sounds from a music player, a human voice (speech signal) and other sounds in the environment.

Step 102, suppressing, according to the sound source position information, a sound signal from the sound source direction in the at least two channels of sound signals, to obtain a noise reference signal of the microphone array.

In the present disclosure, the sound source position information may be used to determine the sound source direction, so that the sound signal from the sound source direction may be determined from the at least two channels of sound signals of the microphone array, and then the sound signal from the sound source direction may be suppressed to obtain the noise signal of the microphone array, which may be used as the noise reference signal in the disclosure.

Step 103, acquiring, according to the sound source position information, a sound signal from the sound source direction in the at least two channels of sound signals, to obtain a speech reference signal.

In this step, the signal from the sound source direction may be determined according to the sound source position information, so that the sound signal from the sound source direction may be acquired, which may be used as the speech reference signal in the disclosure.

It should be noted that steps 102 and 103 may be performed in any order. After performing step 101, step 102 may be performed first or step 103 first.

Step 104, removing, based on the noise reference signal, a residual noise signal in the speech reference signal to obtain a desired speech signal.

There will be some residual noise interference signal in the speech reference signal obtained in step 103, and the residual noise interference signal will affect the quality of the speech signal. In order to improve the signal quality of the desired speech signal, the residual noise signal in the speech reference signal is removed based on the noise reference signal obtained in step 102, so the noise interference of the speech reference signal is reduced in this disclosure. In exemplary embodiments, some speech denoising methods such as adaptive filtering algorithm, subspace denoising algorithm and linear filtering algorithm may be used to remove the residual noise signals in the speech reference signals.

For example, the noise reference signal may be filtered by an adaptive denoising filter, and the speech reference signal and the filtered noise reference signal can be subtracted to obtain the speech enhancement signal. Then the filtering coefficient of the adaptive noise denoising filter may be adjusted based on the speech enhancement signal until the strength of the speech enhancement signal is greater than the preset strength, so as to get the desired speech signal. The disclosed embodiment adopts adaptive noise denoising filter to process noise denoising, which can effectively improve the speech enhancement effect in a specific scene (for example, the number of sound sources is more than the number of microphone), to obtain the desired speech signal with more ideal speech quality.

The speech signal processing method provided by the present disclosure uses the sound source position information to accurately obtain the sound signal from the sound source direction, and then separates the noise signal from the sound signal which comes from the sound source direction. In other words, on the one hand, suppressing the sound signal from the sound source direction to obtain the noise reference signal, on the other hand, acquiring the sound signal from the sound source direction to obtain the speech reference signal, and then removing the residual noise from the sound signal from the sound source direction based on the separated noise signal, to realize the purpose of reducing noise interference and promoting the effect of speech enhancement, so as to extract the desired speech signal with better signal quality.

Figure 2:
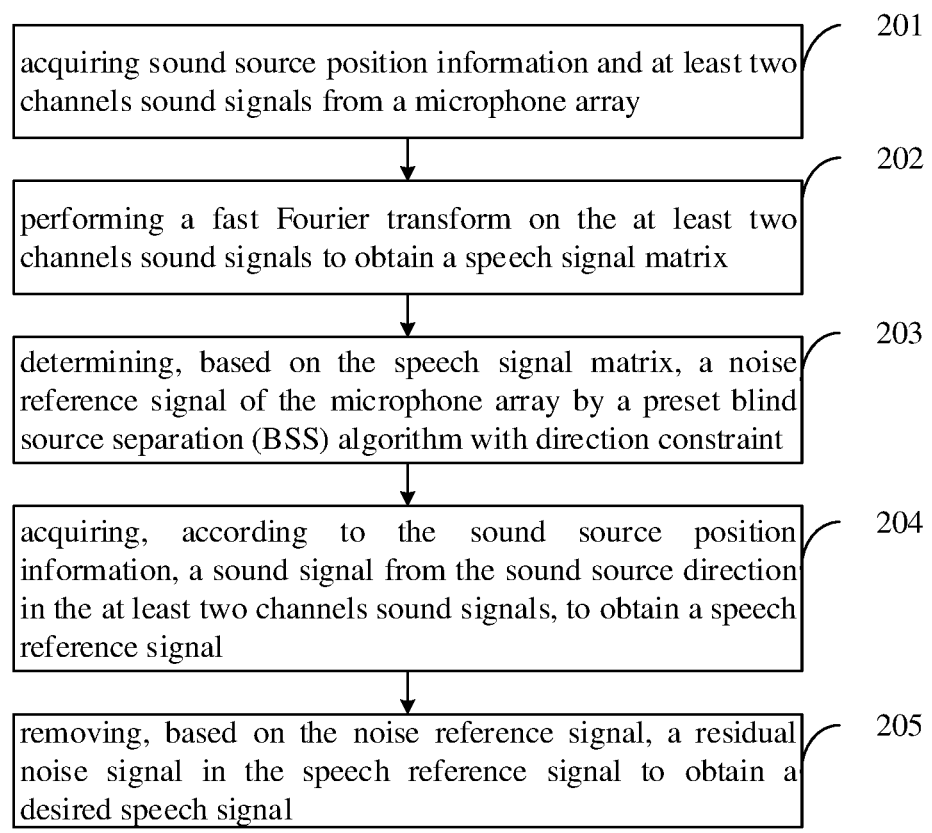
FIG. 2 is a flow diagram illustrating a method for speech signal processing in the second exemplary embodiment.

FIG. 2 is a flow diagram illustrating a method for speech signal processing in the second exemplary embodiment. As shown in FIG. 2, the speech signal processing method provided by the present disclosure may include following steps:

Step 201, acquiring sound source position information and at least two channels of sound signals from a microphone array.

In this exemplary embodiment, the implementation principle and implementation process of step 201 can refer to the relevant description of step 101 in the first exemplary embodiment, which will not be described in detail here for brevity.

Step 202, performing a fast Fourier transform on the at least two channels of sound signals to obtain a speech signal matrix.

In the present disclosure, the sound signal may be represented by the spatial domain and time/frequency information of the sound source. In this step, a fast Fourier transform (FFT) may be performed on the sound signal (for example, spatial domain and time/frequency information) to determine the speech signal matrix. In order to ensure the speech quality of the sound signal, more sampling points will be retained. In the present disclosure, the FFT is used to calculate the sound signal, which can reduce the times of multiplication of the Fourier transform, thus reducing the amount of calculation, speeding up the calculation rate and improving the calculation efficiency.

Step 203, determining, based on the speech signal matrix, a noise reference signal of the microphone array by a preset blind source separation (BSS) algorithm with direction constraint.

According to the embodiment of the present disclosure, the preset BBS algorithm with direction constraint in the present disclosure may exemplary be the BSS algorithm with direction of arrival (DOA) constraint, which may be determined according to the sound source position information. For example, the cost function of the disclosed BSS algorithm with DOA constraint may be expressed as follows:

$$Q_{BSS} = -\sum_{k=0}^{K}\log|\det(W(k))| - \sum_{i=0}^{L}G(y_i) + \lambda\sum_{k=0}^{K}\left(\frac{\text{Re}\{w_1(k)g_\theta^H(k)\}}{\|w_1(k)\|\|g_\theta(k)\|} - 1\right)^2$$

Wherein W(k) represents a separation filter corresponding to the k-th frequency point, log represents taking the logarithm, and det represents finding the determinant of a matrix;

$G(y_i)$ represents a contrast function, which may be expressed as log $q(y_i)$, and the $q(y_i)$ represents the probability density distribution of the i-th sound source;

$$\lambda\sum_{k=0}^{K}\left(\frac{\text{Re}\{w_1(k)g_\theta^H(k)\}}{\|w_1(k)\|\|g_\theta(k)\|} - 1\right)^2$$

represents a penalty factor; $w_1(k)$ represents the first line of the separation matrix W(k), $g_\theta(k)$ represents a filter which forms a spatial zero in the sound source direction θ, λ is used to control the strength of the constraint condition.

For example, step 203 may be implemented as follows: determining a steering vector of the sound source direction according to the sound source position information and the speech signal matrix, then determining a first filter according to the steering vector, and the first filter is configured to suppress the speech signal from the sound source direction. Furthermore, the first filter is set as an initial value of the first set separation filters of the BSS algorithm with direction constraint in the present disclosure. In some embodiments, $w_1(k)$ will converge near the $g_\theta(k)$ based on the penalty factor of the BSS with direction constraint in this disclosure (shown as the description in step 105). The penalty factor term introduced by the formula is 0 when $w_1(k)=g_\theta(k)$, which will form a spatial zero in the sound source direction, thereby suppressing the signal from the sound source direction and outputting the noise reference signal from the microphone array.

In the embodiment of the present disclosure, for any channel sound signal of the speech signal matrix, the steering vector of which may be determined through the following solution: for example, supposing the number of the microphones is 2, in the free field condition, for the sound signal from θ direction of the speech signal matrix, the steering vector $h_\theta(k)$ may be expressed as:

$$h_\theta(k)=[1 e^{-jkr\cos\theta}]^T$$

wherein r represents the spacing of the microphone in the microphone array, k represents the wave number, θ represents the direction of the sound signal (or the sound source position).

Furthermore, in the embodiment of the present disclosure, in order to suppress the sound signal of the θ direction, the first filter may be determined according to the steering vector. For example, $g_\theta(k)$ represents the first filter, then the spatial response of the $g_\theta(k)$ in the θ direction may be expressed as:

$$g_\theta(k)h_\theta(k)=0$$

For example, the first filter $g_\theta(k)$ may be expressed as:

$$g_\theta(k)=[1-e^{jkr\cos\theta}]$$

Step 204, acquiring, according to the sound source position information, a sound signal from the sound source direction in the at least two channels of sound signals, to obtain a speech reference signal.

In the embodiment of the present disclosure, after the sound signal of microphone array is separated by BSS algorithm with direction constraint, the noise reference signal may be obtained in one channel (referring to the step 202 and step 203), and the speech reference signal may be obtained in the other channel as shown in this step.

Step 205, removing, based on the noise reference signal, a residual noise signal in the speech reference signal to obtain a desired speech signal.

In the exemplary embodiment, the implementation principle and implementation process of step 205 may refer to the relevant description of step 104 in the first exemplary embodiment, which will not be described in detail here for brevity.

Combined with the description of the previous steps, the first filter $g_\theta(k)$ is designed based on the free field model, and the effect of the spatial zero formed by $g_\theta(k)$ is not ideal due to the existence of the reverberation in the actual environment. In addition, the BSS algorithm may form a relatively ideal spatial zero, but the BSS algorithm is sensitive to the initial value selection of the separation matrix, and the BSS algorithm cannot guarantee the formation of the spatial zero in the sound source direction when the number of sound sources is more than the number of microphones. In the embodiment of the present disclosure, adding DOA constraint (sound source position information provided) may provide a relatively ideal initial value for BSS algorithm. Furthermore, the penalty factor of the BSS algorithm with direction constraint in the present disclosure (shown as the related description in step 203) may make $w_1(k)$ converge near $g_\theta(k)$. The penalty factor term introduced by the formula is 0 when $w_1(k)=g_\theta(k)$, which will form a spatial zero in the sound source direction, thereby suppressing the signal from the sound source direction and outputting the noise reference signal from the microphone array. Thus, the effect of removing the residual noise from the speech reference signal based on the noise reference signal is particularly desirable, so as to output the desired speech signal with better quality.

Figure 3:
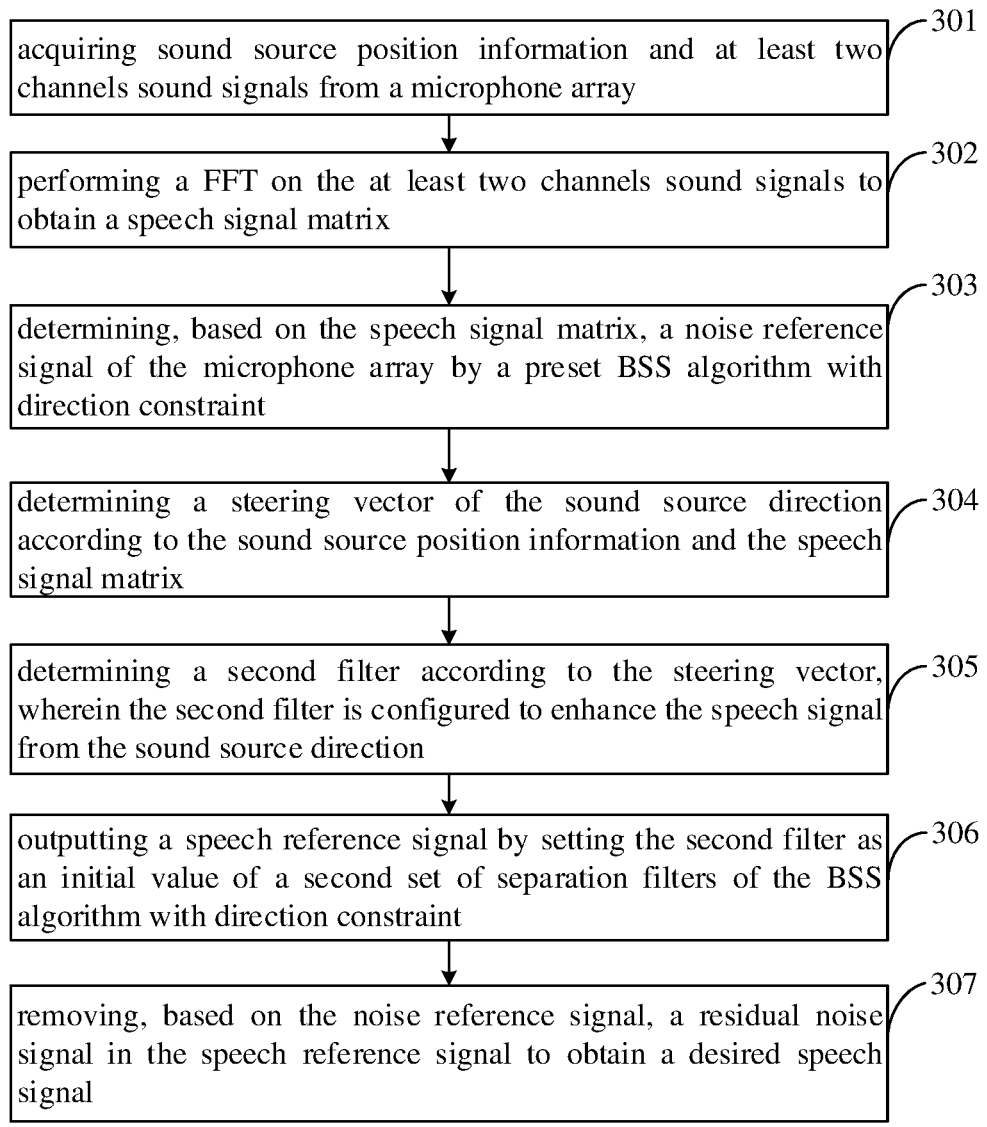
FIG. 3 is a flow diagram illustrating a method for speech signal processing in the third exemplary embodiment.

FIG. 3 is a flow diagram illustrating a method for speech signal processing in the third exemplary embodiment.

Based on the second exemplary embodiment shown in FIG. 2, as shown in FIG. 3, the speech signal processing method provided by the present disclosure may also include following steps:

Step 301, acquiring sound source position information and at least two channels of sound signals from a microphone array.

In the exemplary embodiment, the implementation principle and implementation process of step 301 may refer to the relevant description of step 101 in the first exemplary embodiment, which will not be described in detail here for brevity.

Step 302, performing an FFT on the at least two channels of sound signals to obtain a speech signal matrix.

In the exemplary embodiment, the implementation principle and implementation process of step 302 may refer to the relevant description of step 202 in the second exemplary embodiment, which will not be described in detail here for brevity.

Step 303, determining, based on the speech signal matrix, a noise reference signal of the microphone array by a preset BSS algorithm with direction constraint.

In the exemplary embodiment, the implementation principle and implementation process of step 303 may refer to the relevant description of step 203 in the second exemplary embodiment, which will not be described in detail here for brevity.

Step 304, determining a steering vector of the sound source direction according to the sound source position information and the speech signal matrix.

The implementation principle and process of this step may refer to the relevant description about the steering vector of step 203 in the second exemplary embodiment.

Step 305, determining a second filter according to the steering vector, wherein the second filter is configured to enhance the speech signal from the sound source direction.

In the embodiment of the present disclosure, the steering vector may characterize the characteristics of the sound signal. Furthermore, the second filter may be determined based on the characteristics of the sound signal of the microphone array. For example, the second filter may be configured to enhance the speech signal in the sound source direction after calculating with the steering vector.

Step 306, outputting a speech reference signal by setting the second filter as an initial value of a second set separation filters of the BSS algorithm with direction constraint.

Step 307, removing, based on the noise reference signal, a residual noise signal in the speech reference signal to obtain a desired speech signal.

In the exemplary embodiment, the implementation principle and implementation process of step 307 may refer to the relevant description of step 104 in the first exemplary embodiment, which will not be described in detail here for brevity.

In the embodiment of the present disclosure, adding DOA constraint (sound source position information provided) may provide a relatively ideal initial value for BSS algorithm, so as to improve the separation effect of the BSS algorithm and enhance the speech signal in the sound source direction.

Figure 4:
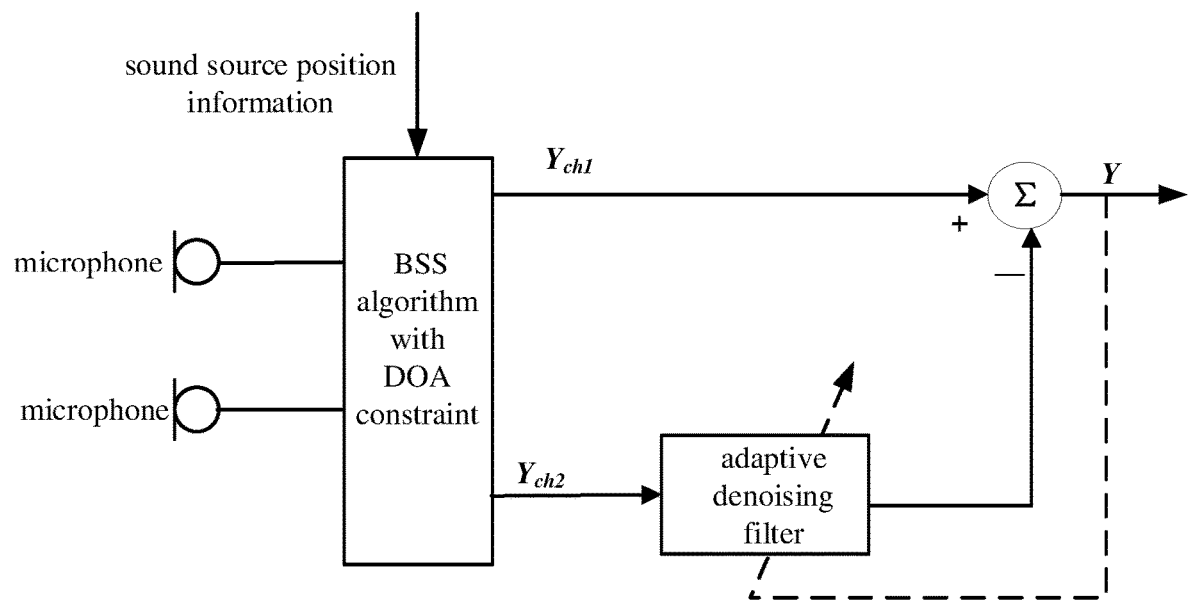
FIG. 4 is a system structure diagram illustrating an exemplary embodiment of this disclosure.

In order to clearly and accurately understand the disclosed technical solution by persons having ordinary skill in the art, the above embodiments will be further described in combination with the system structure diagram below. The aforementioned first, second, and third exemplary embodiments can all be implemented based on the system structure diagram shown in FIG. 4. FIG. 4 is a system structure diagram illustrating an exemplary embodiment of this disclosure. As shown in FIG. 4, the disclosure provides a speech signal processing method that can acquire sound source position information and at least two channels of sound signals from a microphone array, and obtain a speech reference signal $Y_{ch1}$ and a noise reference signal $Y_{ch2}$ separately based on the BSS algorithm with DOA constraint, and then based on the noise reference signal $Y_{ch2}$, perform the denoising processing to the speech reference signal $Y_{ch1}$ by using such as adaptive denoising filter to output the desired speech signal Y. It should be understood that only two channels of sound signals from the microphone array are shown in the figure. In fact, there may be two or more channels of sound signals.

Figure 5:
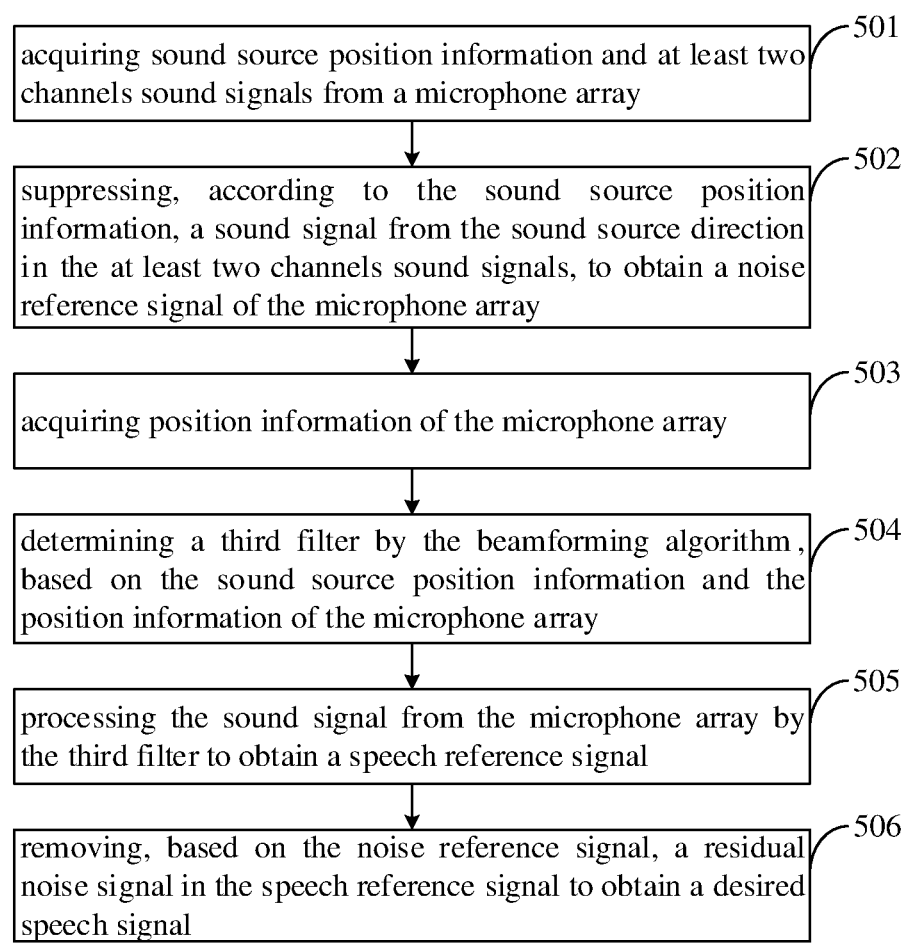
FIG. 5 is a flow diagram illustrating a method for speech signal processing in the fourth exemplary embodiment.

FIG. 5 is a flow diagram illustrating a method for speech signal processing in the fourth exemplary embodiment. As shown in FIG. 5, the speech signal processing method provided by the present disclosure may also include following steps:

Step 501, acquiring sound source position information and at least two channels of sound signals from a microphone array.

In the exemplary embodiment, the implementation principle and implementation process of step 501 may refer to the relevant description of step 101 in the first exemplary embodiment, which will not be described in detail here for brevity.

Step 502, suppressing, according to the sound source position information, a sound signal from the sound source direction in the at least two channels of sound signals, to obtain a noise reference signal of the microphone array.

In the exemplary embodiment, the implementation principle, implementation process and technical effect of step 502 may refer to the relevant description of step 102 in the first exemplary embodiment and step 202, step 203 in the second exemplary embodiment, which will not be described in detail here for brevity.

Step 503, acquiring position information of the microphone array.

In the embodiment of the present disclosure, the distance information between two adjacent microphones in the microphone array may be acquired as the position information of the microphone array in this step. The position information of the microphone array may be acquired by acquiring the input information of the input device or from the configuration information of the microphone array itself. There is no restriction on this in the embodiment of the present disclosure.

Step 504, determining a third filter by the beamforming algorithm, based on the sound source position information and the position information of the microphone array.

In the embodiment of the present disclosure, the third filter may be determined by the fixed beamforming algorithm. For example, the distance between two adjacent microphones in the microphone array is expressed as d, and assuming the sound source is located in the far field, the incident angle of the beam to the array is θ, and the sound speed is c, then the delay between the n-th microphone and the reference microphone may be expressed as: $F_n(\tau)=(n-1)\tau=(n-1)d\cos(\theta)/c$, and then for the determination of the incident angle θ, firstly, a generalized cross-correlation function method may be used to estimate the delay difference between the sound source reaching the reference microphone and another microphone, and the distance difference may be calculated by the delay, and then the distance difference and the spatial geometric position of the microphone array may be used to determine the incident angle θ, for example, it can be expressed as $$\theta = \arccos\left(\frac{\tau \times c}{d}\right),$$

thus the third filter may be determined.

The determination of the third filter by the fixed beamforming algorithm is only an exemplary embodiment of the present disclosure, this disclosure does not limited to one algorithm using the fixed beamforming algorithm to implement; for example, it may also be implemented by an adaptive beamforming algorithm.

Step 505, processing the sound signal from the microphone array by the third filter to obtain a speech reference signal.

In this step, inputting the sound signal from the microphone array into the third filter in step 504, for example, the sound signal at least includes the sound velocity and other information directly or indirectly, then the incident angle θ of the beam reaching the array may be determined, and the sound signal in the sound source direction may be determined to output the speech reference signal.

Step 506, removing, based on the noise reference signal, a residual noise signal in the speech reference signal to obtain a desired speech signal.

In the exemplary embodiment, the implementation principle, implementation process and technical effect of step 506 may refer to the relevant description of step 104 in the first exemplary embodiment or step 506 may be implemented by the implementation method introduced in step 104 of the first exemplary embodiment, which will not be described in detail here for brevity.

According to the embodiment of the present disclosure, the noise reference signal of the microphone array may be determined by combining with the sound source position information, and the speech reference signal may be determined based on the beamforming algorithm and combined with sound source position information, which can reduce the signal leak of the speech reference signals, and a further denoising processing for speech reference signal based on the noise reference signal may further suppress the interference component of the desired speech signal.

In order to clearly and accurately understand the disclosed technical solution by persons having ordinary skill in the art, the above embodiments will be further described in combination with the system structure diagram below, and the aforementioned fourth exemplary embodiment can be implemented based on the system structure diagram shown in FIG. 6.

Figure 6:
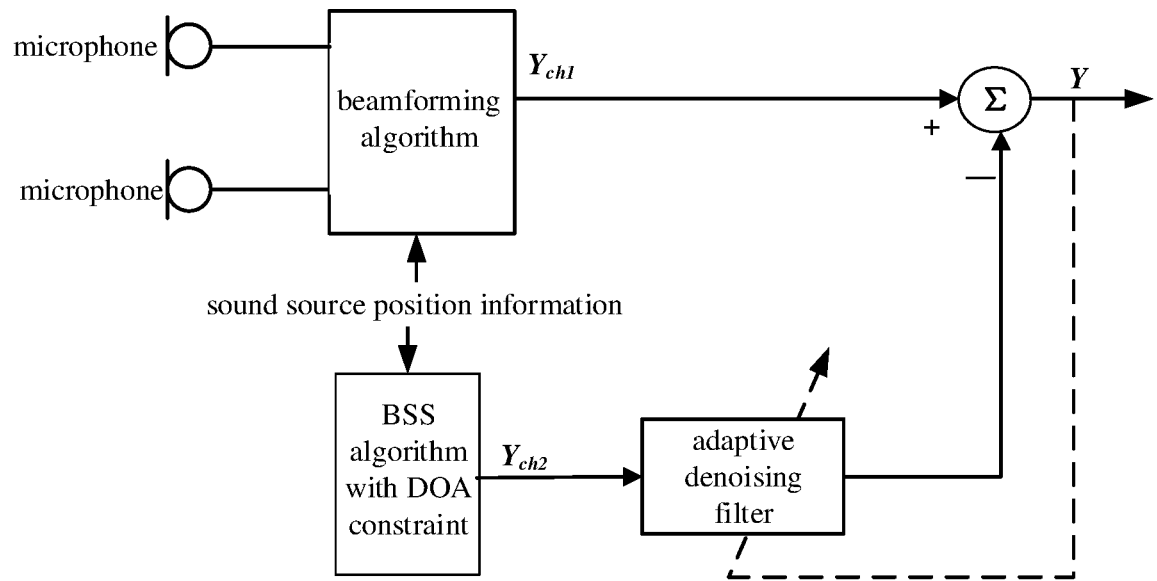
FIG. 6 is a system structure diagram illustrating another exemplary embodiment of this disclosure.

FIG. 6 is a system structure diagram illustrating another exemplary embodiment of this disclosure. As shown in the structure diagram of FIG. 6, after acquiring the sound source position information and the at least two channels of sound signals from the microphone array, they may be processed by the beamforming algorithm and the BSS algorithm with DOA constraint respectively. For example, the sound source direction may be determined when the distance between adjacent microphones can be known, and the speech reference signal $Y_{ch1}$ may be obtained; and the noise reference signal $Y_{ch1}$ may be determined after the process of BSS algorithm with DOA constraint. Therefore, the speech reference signal obtained by the beamforming algorithm can reduce the influence of the situation with large number of microphones in the microphone array (therefore, it is especially suitable for the situation with large number of microphones in the microphone array). BSS algorithm with DOA constraint can effectively suppress the sound signal in the sound source direction, so as to obtain the especially desirable (the sound signal component in the sound source direction is less) noise reference signal. Therefore, the desired speech signal Y can be determined finally based on the speech reference signal and the noise reference signal, and the noise interference component of which is reduced and the speech enhancement effect is improved.

The embodiments above-mentioned describe the speech signal processing method in detail, and the present disclosure also provides a speech signal processing device. The speech signal processing device will be described below in combination with the drawings. The function of the module, unit or subunit involved in the device can correspond to the speech signal processing method above-mentioned, and the technical effect can refer to the relevant embodiments of the speech signal processing method above-mentioned.

Figure 7:
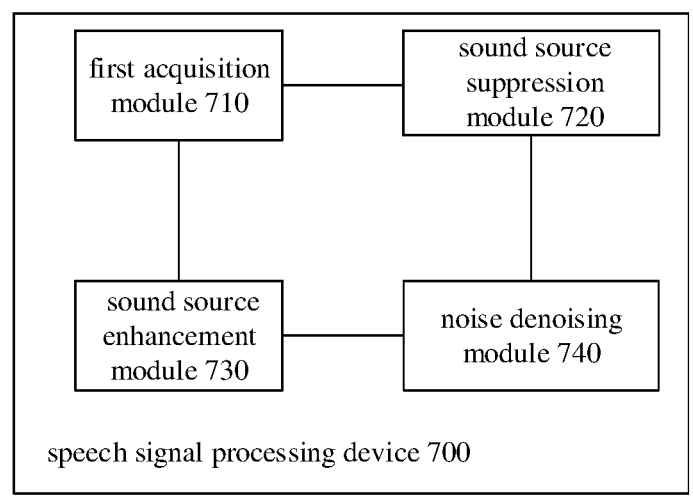
FIG. 7 is a structure diagram illustrating a speech signal processing device in the first exemplary embodiment.

FIG. 7 is a structure diagram illustrating a speech signal processing device in the first exemplary embodiment. As shown in FIG. 7, the speech signal processing device 700 in the present disclosure may include: a first acquisition module 710, a sound source suppression module 720, a sound source enhancement module 730 and a noise denoising module 740.

The first acquisition module 710 may be configured to acquire a sound source position information and at least two channels of sound signals from a microphone array. The sound source suppression module 720 may be configured to suppress a sound signal from the sound source direction in the at least two channels of sound signals according to the sound source position information obtained in the first acquisition module 710, to obtain a noise reference signal of the microphone array. The sound source enhancement module 730 may be configured to acquire a sound signal from the sound source direction in the at least two channels of sound signals according to the sound source position information obtained in the first acquisition module 710, to obtain a speech reference signal. The noise denoising module 740 may be configured to remove a residual noise signal in the speech reference signal based on the noise reference signal obtained in the sound source suppression module 720, to obtain a desired speech signal.

Figure 8:
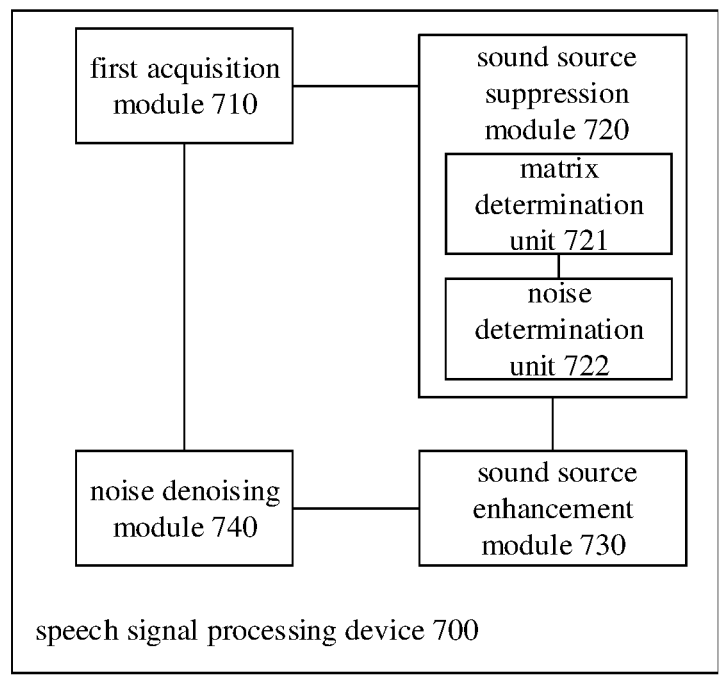
FIG. 8 is a structure diagram illustrating a speech signal processing device in the second exemplary embodiment.

FIG. 8 is a structure diagram illustrating a speech signal processing device in the second exemplary embodiment. As shown in FIG. 8, the speech signal processing device 700 in the present disclosure may include: a first acquisition module 710, a sound source suppression module 720, a sound source enhancement module 730 and a noise denoising module 740.

The sound source suppression module 720 may include a matrix determination unit 721 and a noise determination unit 722. The matrix determination unit 721 may be configured to perform the FFT to the at least two sound signals to obtain a speech signal matrix. The noise determination unit 722 may be configured to determine a noise reference signal of the microphone array by a preset BSS algorithm with direction constraint and based on the speech signal matrix, and the preset BSS algorithm with direction constraint is determined according to the sound source position information.

Furthermore, the noise determination unit 722 may also include a vector determination subunit (not shown), a signal suppression subunit (not shown), and a noise determination subunit (not shown). The vector determination subunit may be configured to determine a steering vector of the sound source direction according to the sound source position information and the speech signal matrix; the signal suppression subunit may be configured to determine a first filter according to the steering vector, and the first filter is configured to suppress a speech signal of the sound source direction; the noise determination subunit may be configured to output a noise reference signal of the microphone array by setting the first filter as an initial value of the first set of separation filters of the BSS algorithm with direction constraint.

Figure 9:
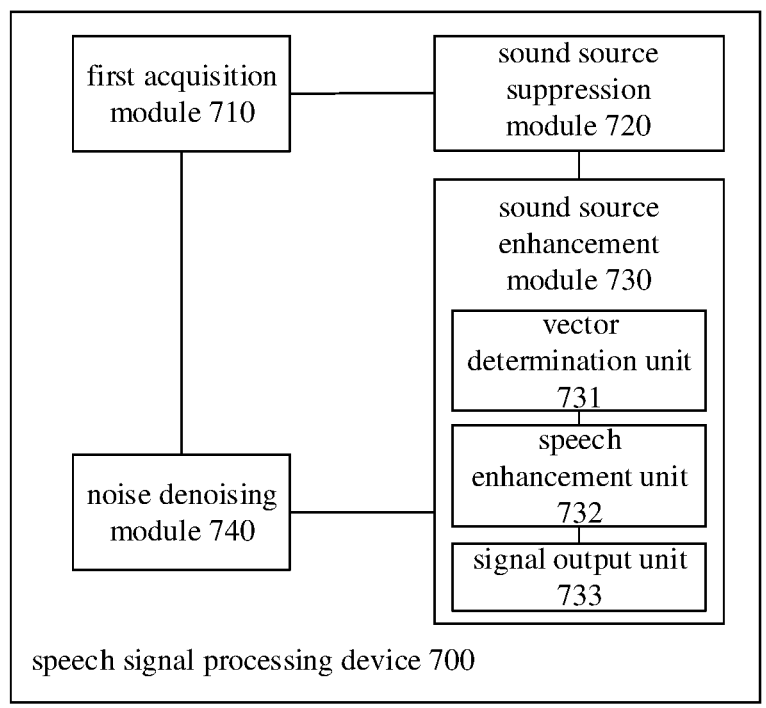
FIG. 9 is a structure diagram illustrating a speech signal processing device in the third exemplary embodiment.

FIG. 9 is a structure diagram illustrating a speech signal processing device in the third exemplary embodiment. As shown in FIG. 9, the speech signal processing device 700 in the present disclosure may include: a first acquisition module 710, a sound source suppression module 720, a sound source enhancement module 730 and a noise denoising module 740. The sound source enhancement module 730 may include a vector determination unit 731, a speech enhancement unit 732 and a signal output unit 733.

The vector determination unit 731 may be configured to determine a steering vector of the sound source according to the sound source position information and the speech signal matrix. The speech enhancement unit 732 may be configured to determine a second filter according to the steering vector, and the second filter is configured to enhance a speech signal of the sound source direction. The signal output unit 733 may be configured to output a speech reference signal by setting the second filter as an initial value of the second set of separation filters of the BSS algorithm with direction constraint.

Figure 10:
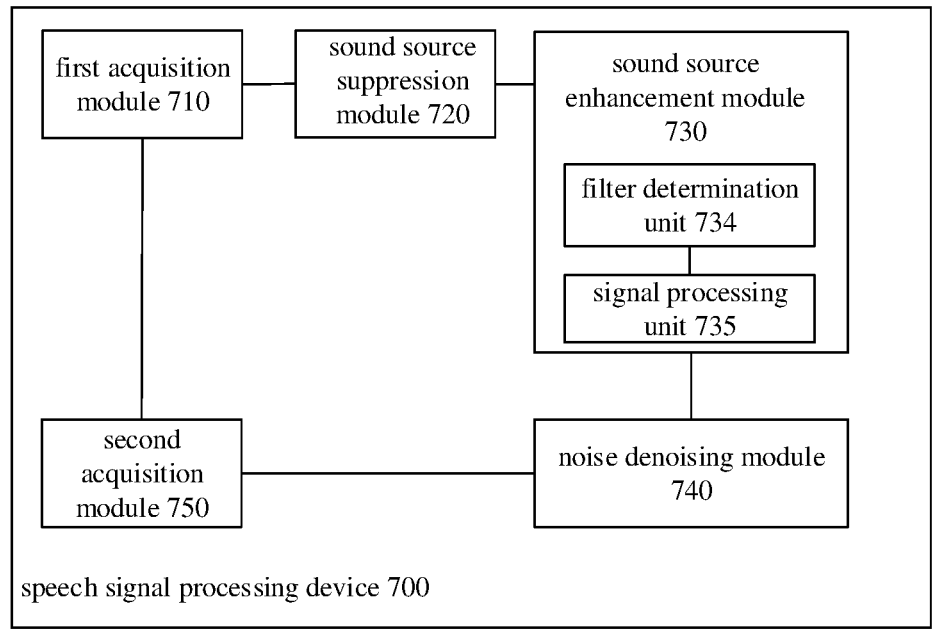
FIG. 10 is a structure diagram illustrating a speech signal processing device in the fourth exemplary embodiment.

FIG. 10 is a structure diagram illustrating a speech signal processing device in the fourth exemplary embodiment. As shown in FIG. 10, the speech signal processing device 700 in the present disclosure may also include a second acquisition module 750, and the sound source enhancement module 730 including a filter determination unit 734 and a signal processing unit 735.

The second acquisition module 750 is configured to acquire position information of the microphone array, and the filter determination unit 734 may be configured to determine a third filter by beamforming algorithm according to the sound source position information and the position information of the microphone array; the signal processing unit 735 may be configured to process the sound signal from the microphone array by the third filter to obtain the speech reference signal.

Figure 11:
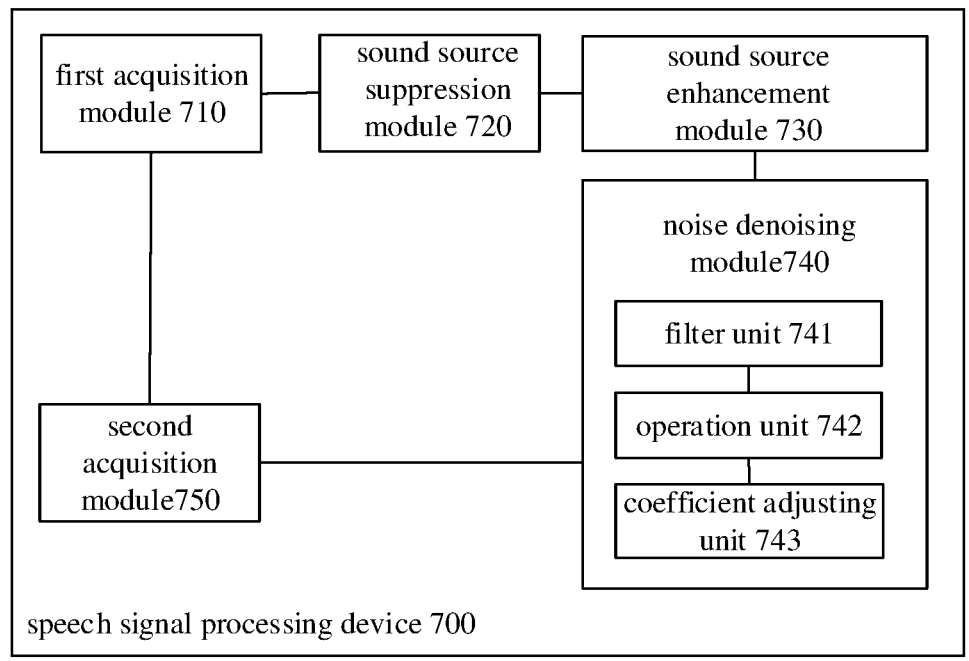
FIG. 11 is a structure diagram illustrating a speech signal processing device in the fifth exemplary embodiment.

FIG. 11 is a structure diagram illustrating a speech signal processing device in the fifth exemplary embodiment. As shown in FIG. 11, based on the embodiments above-mentioned as FIG. 7-FIG. 10, the noise denoising module 740 may include a filter unit 741, an operation unit 742 and a coefficient adjusting unit 743.

The filter unit 741 may be configured to perform filter processing for the noise reference signal by an adaptive denoising filter; the operation unit 742 may be configured to subtract the filtered noise reference signal from the speech reference signal to obtain a speech enhancement signal; the coefficient adjusting unit 743 may be configured to adjust the filter coefficient of the adaptive denoising filter based on the speech enhancement signal until the strength of the speech enhancement signal is greater than the preset strength, so as to obtain the desired speech signal.

Combining with the sound source position information, the speech signal processing device provided by the present disclosure suppresses the sound signal from the sound source direction to obtain the noise reference signal on one hand, acquires the sound signal from the sound source direction to obtain the speech reference signal on the other hand, then removes the noise signal from the speech reference signal, so as to achieve the purpose of lower noise and improving the speech enhancement effect.

Figure 12:
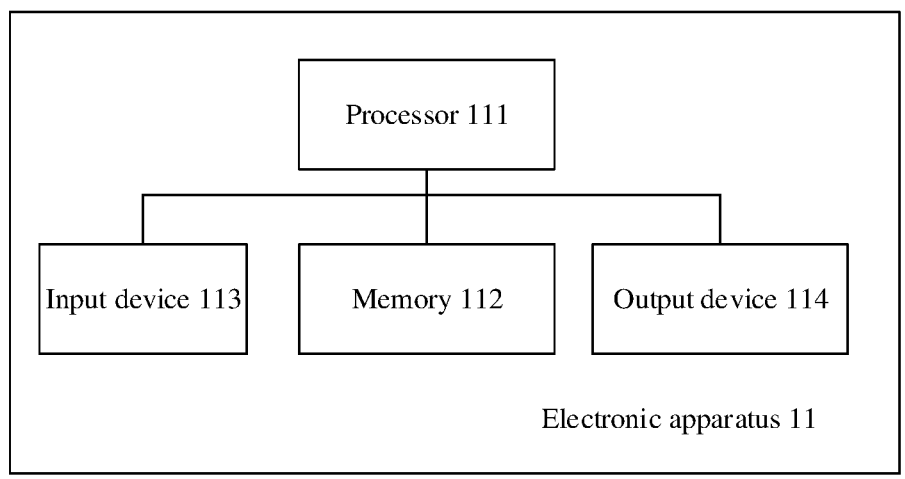
FIG. 12 is a structure diagram illustrating an electronic apparatus provided by an exemplary embodiment of this disclosure.

FIG. 12 is a structure diagram illustrating an electronic apparatus provided by an exemplary embodiment of this disclosure.

As shown in FIG. 12, the electronic apparatus 11 may include one or more processors 111 and a memory 112.

The processor 111 may be a central processing unit (CPU) or other form of processing unit with data processing capability and/or instruction execution capability, and the processor 111 may control other components of the electronic apparatus 11 to execute the desired function.

The memory 112 may include one or more computer program products, and the computer program products may include various forms of computer readable storage media, such as volatile memory and/or non-volatile memory. The volatile memory may include, for example, random access memory (RAM) and/or cache memory, etc. The non-volatile memory may include, for example, read-only memory (ROM), hard disk, flash memory, etc. One or more computer program instructions may be stored on the computer-readable storage media, and the processor 111 may execute program instructions to achieve the speech signal processing method and/or other desired function described above-mentioned in each embodiment of the present disclosure. Various contents may be stored in the computer readable storage media such as input signal, signal component, noise component and so on.

In one embodiment, the electronic apparatus 11 may also include an input device 113 and an output device 114, which are interconnected by a bus system and/or other form of connection mechanism (not shown).

For example, the input device 113 may be the camera or microphone, microphone array, etc. above, which is configured to capture the input signal of an image or sound source. When the electronic apparatus is a stand-alone apparatus, the input device 123 may be a communication network connector for receiving the signals acquired from the neural network processor.

In addition, the input device 113 may include, for example, a keyboard, mouse, and so on.

The output device 114 may output all kinds of information to the outside, including the determined output voltage, output current information, etc. The output device 114 may include, for example, a display, a speaker, a printer, and a communication network and a remote output device connected to the communication network and so on.

Only some of the components in this electronic apparatus 11 that are relevant to this disclosure are shown in FIG. 12 for simplicity, and some components are omitted such as the bus, input/output interface, and so on. In addition, electronic apparatus 11 may include any other appropriate components depending on the specific application.

In addition to the above method and apparatus, the embodiment of the present disclosure may be a computer program product, which include computer program instructions, when the computer program instructions are executed by the processor, the processor performs the method described in the section "exemplary method" above-mentioned according to steps in the speech signal processing method in the disclosed embodiments.

The computer program product may be any combination of one or more programming language to write the program code to execute the operation in the disclosed embodiment, and the programming language may include an object-oriented programming language, such as Java, C++, etc., the programming language may also include a conventional procedural programming language, such as "C" or similar programming language. The program code may be executed entirely on a user computing device, partially on a user computing device, as a separate software package, partially on a user computing device and partially on a remote computing device, or entirely on a remote computing device or server.

In addition, the embodiment of the present disclosure may be a computer readable storage medium, which stores with computer program instructions, when the computer program instructions are executed by the processor, the processor performs the method described in the section "exemplary method" above-mentioned according to steps in the speech signal processing method in the disclosed embodiments.

The computer readable storage medium may be any combination of one or more readable media. The readable media may be readable signal medium or readable storage medium. The readable storage medium may include but not limited to an electrical, magnetic, optical, electromagnetic, infrared, or semiconductor systems, devices or means, or any combination of the above. The more specific example (not exhaustive list) of the readable storage medium includes: an electrical connection having one or more wires, a portable disk, a hard disk, a random access memory (RAM), a read-only memory (ROM), an erasable programmable read-only memory (EPROM or flash), an optical fiber, a portable compact disc read-only memory (CD-ROM), an optical storage device, a magnetic storage device, or any appropriate combination of the above.

The principles of this disclosure are described above in combination with specific embodiments; however, it should be noted that the benefits, advantages, and effects mentioned in this disclosure are only examples and not limitations, and these benefits, advantages, and effects are not considered necessary for each embodiment of this disclosure. In addition, the details disclosed above are only for the illustrative purposes and for ease understanding, and are not limitations, and the above details do not limit the implementation of this disclosure to the use of these specific details.

The block diagrams of mean, device, apparatus and system referred in this disclosure are only for illustrative purposes and are not intended to require or imply that they must be connected, arranged or configured in the manner shown in the block diagrams. Persons having ordinary skill in the art will recognize, the mean, device, apparatus and system may be connected, arranged, and configured in any manner. Words such as "comprise", "include", "with", etc. are open words that mean "include but not limited to" and may be used interchangeably. The words "or" and "and" used here refer to the words "and/or" and may be used interchangeably, unless the context expressly indicates otherwise. The word "such as" used here refers to the phrase "such as but not limited to" and may be used interchangeably.

It should also be noted that the components or steps in the device, apparatus and method of the present disclosure may be decomposed and/or recombined. These decompositions and/or recombining shall be regarded as equivalent solution to this disclosure.

The above descriptions provided by the disclosure are to enable any persons having ordinary skill in the art to make or use this disclosure. The various modifications to these aspects are obvious to those having ordinary skill in the art, and the general principles defined herein can be applied to other aspects without deviating from the scope of this disclosure. Therefore, this disclosure is not intended to be limited to the aspects shown herein, but to the widest scope consistent with the principles and novel features disclosed herein.

The above description has been given for the purpose of illustration and description. Furthermore, this description is not intended to limit the present disclosed embodiments to the form disclosed herein. Although a number of examples and embodiments have been discussed above, some variations, modifications, changes, additions, and recombining will be recognized by persons having ordinary skill in the art.

What is claimed is:

1. A method for speech signal processing, comprising:
   acquiring sound source position information and at least two channels of sound signals from a microphone array;
   suppressing, according to the sound source position information, a sound signal from a sound source direction in the at least two channels of sound signals, to obtain a noise reference signal of the microphone array;
   acquiring, according to the sound source position information, a sound signal from the sound source direction in the at least two channels of sound signals, to obtain a speech reference signal, wherein the speech reference signal is the sound signal from the sound source direction; and
   removing, based on the noise reference signal, a residual noise signal in the speech reference signal to obtain a desired speech signal.

2. The method according to claim 1, wherein the suppressing, according to the sound source position information, a sound signal from the sound source direction in the at least two channels of sound signals, to obtain a noise reference signal of the microphone array comprises:
   performing a fast Fourier transform on the at least two channels of sound signals to obtain a speech signal matrix; and
   determining, based on the speech signal matrix, the noise reference signal of the microphone array by a preset blind source separation algorithm with direction constraint, wherein the preset blind source separation algorithm with direction constraint is determined according to the sound source position information.

3. The method according to claim 2, wherein the determining, based on the speech signal matrix, the noise reference signal of the microphone array by a preset blind source separation algorithm with direction constraint comprises:
  determining a steering vector of the sound source direction according to the sound source position information and the speech signal matrix;
  determining a first filter according to the steering vector, wherein the first filter is configured to suppress the speech signal from the sound source direction; and
  outputting the noise reference signal of the microphone array by setting the first filter as an initial value of a first set of separation filters of the blind source separation algorithm with direction constraint.

4. The method according to claim 1, wherein the acquiring, according to the sound source position information, a sound signal from the sound source direction in the at least two channels of sound signals, to obtain a speech reference signal comprises:
  determining a steering vector of the sound source direction according to the sound source position information and the speech signal matrix;
  determining a second filter according to the steering vector, wherein the second filter is configured to enhance the speech signal from the sound source direction; and
  outputting the speech reference signal by setting the second filter as an initial value of a second set of separation filters of the blind source separation algorithm with direction constraint.

5. The method according to claim 4, wherein the determining a second filter according to the steering vector comprises:
  determining the second filter according to characteristics of the sound signal of the microphone array represented by the steering vector.

6. The method according to claim 1, further comprising:
  acquiring position information of the microphone array, wherein
  the acquiring, according to the sound source position information, a sound signal from the sound source direction in the at least two channels of sound signals, to obtain a speech reference signal further comprises:
  determining a third filter by a beamforming algorithm, based on the sound source position information and the position information of the microphone array; and
  processing the sound signal from the microphone array by the third filter to obtain the speech reference signal.

7. The method according to claim 6, wherein the acquiring position information of the microphone array comprises:
  acquiring distance information between two adjacent microphones in the microphone array as the position information of the microphone array.

8. The method according to claim 6, wherein the acquiring position information of the microphone array comprises:
  acquiring the position information of the microphone array by input information of an input device.

9. The method according to claim 6, wherein the acquiring position information of the microphone array comprises:
  acquiring the position information of the microphone array from configuration information of the microphone array itself.

10. The method according to claim 6, wherein the determining a third filter by a beamforming algorithm comprises:
  determining the third filter by a fixed beamforming algorithm or an adaptive beamforming algorithm.

11. The method according to claim 1, wherein the removing, based on the noise reference signal, a residual noise signal in the speech reference signal to obtain a desired speech signal comprises:
  filtering the noise reference signal by an adaptive denoising filter;
  performing a subtraction operation on the speech reference signal and the filtered noise reference signal and to obtain a speech enhancement signal; and
  adjusting a filter coefficient of the adaptive denoising filter base on the speech enhancement signal, until a strength of the speech enhancement signal is greater than a preset strength, to obtain the desired speech signal.

12. An electronic apparatus, comprising:
  a processor; and
  a memory for storing instructions executable by the processor,
  wherein the processor is configured to perform a method for speech signal processing, comprising:
  acquiring sound source position information and at least two channels of sound signals from a microphone array;
  suppressing, according to the sound source position information, a sound signal from a sound source direction in the at least two channels of sound signals to obtain a noise reference signal of the microphone array;
  acquiring, according to the sound source position information, a sound signal from the sound source direction in the at least two channels of sound signals to obtain a speech reference signal, wherein the speech reference signal is the sound signal from the sound source direction; and
  removing, based on the noise reference signal, a residual noise signal in the speech reference signal to obtain a desired speech signal.

13. The electronic apparatus according to claim 12, wherein the suppressing, according to the sound source position information, a sound signal from the sound source direction in the at least two channels of sound signals, to obtain a noise reference signal of the microphone array comprises:
  performing a fast Fourier transform on the at least two channels of sound signals to obtain a speech signal matrix; and
  determining, based on the speech signal matrix, the noise reference signal of the microphone array by a preset blind source separation algorithm with direction constraint, wherein the preset blind source separation algorithm with direction constraint is determined according to the sound source position information.

14. The electronic apparatus according to claim 13, wherein the determining, based on the speech signal matrix, the noise reference signal of the microphone array by a preset blind source separation algorithm with direction constraint comprises:
  determining a steering vector of the sound source direction according to the sound source position information and the speech signal matrix;
  determining a first filter according to the steering vector, wherein the first filter is configured to suppress the speech signal from the sound source direction; and
  outputting the noise reference signal of the microphone array by setting the first filter as an initial value of a first set of separation filters of the blind source separation algorithm with direction constraint.

15. The electronic apparatus according to claim 12, wherein the acquiring, according to the sound source position information, a sound signal from the sound source direction in the at least two channels of sound signals, to obtain a speech reference signal comprises:
- determining a steering vector of the sound source direction according to the sound source position information and the speech signal matrix;
- determining a second filter according to the steering vector, wherein the second filter is configured to enhance the speech signal from the sound source direction; and
- outputting the speech reference signal by setting the second filter as an initial value of a second set of separation filters of the blind source separation algorithm with direction constraint.

16. The electronic apparatus according to claim 12, further comprising:
- acquiring position information of the microphone array, wherein
- the acquiring, according to the sound source position information, a sound signal from the sound source direction in the at least two channels of sound signals, to obtain a speech reference signal further comprises:
- determining a third filter by a beamforming algorithm, based on the sound source position information and the position information of the microphone array; and
- processing the sound signal from the microphone array by the third filter to obtain the speech reference signal.

17. The electronic apparatus according to claim 12, wherein the removing, based on the noise reference signal, a residual noise signal in the speech reference signal to obtain a desired speech signal comprises:
- filtering the noise reference signal by an adaptive denoising filter;
- performing a subtraction operation on the speech reference signal and the filtered noise reference signal and to obtain a speech enhancement signal; and
- adjusting a filter coefficient of the adaptive denoising filter base on the speech enhancement signal, until a strength of the speech enhancement signal is greater than a preset strength, to obtain the desired speech signal.

18. A non-transitory computer readable storage medium, wherein the storage medium stores computer programs, and the computer programs are configured to perform a method for speech signal, comprising:
- acquiring sound source position information and at least two channels of sound signals from a microphone array;
- suppressing, according to the sound source position information, a sound signal from a sound source direction in the at least two channels of sound signals, to obtain a noise reference signal of the microphone array;
- acquiring, according to the sound source position information, a sound signal from the sound source direction in the at least two channels of sound signals, to obtain a speech reference signal wherein the speech reference signal is the sound signal from the sound source direction; and
- removing, based on the noise reference signal, a residual noise signal in the speech reference signal to obtain a desired speech signal.

19. The method according to claim 1, wherein the removing, based on the noise reference signal, a residual noise signal in the speech reference signal to obtain a desired speech signal comprises:
- filtering the noise reference signal by a speech denoising method;
- subtracting the filtered noise reference signal from the speech reference signal to obtain the desired speech signal.

20. The electronic apparatus according to claim 12, wherein the removing, based on the noise reference signal, a residual noise signal in the speech reference signal to obtain a desired speech signal comprises:
- filtering the noise reference signal by a speech denoising method;
- subtracting the filtered noise reference signal from the speech reference signal to obtain the desired speech signal.

* * * * *